United States Patent
Oomoto

(10) Patent No.: US 9,581,198 B2
(45) Date of Patent: Feb. 28, 2017

(54) ROLLING BEARING DEVICE

(71) Applicant: NTN CORPORATION, Osaka (JP)

(72) Inventor: Kaoru Oomoto, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/889,631

(22) PCT Filed: May 8, 2014

(86) PCT No.: PCT/JP2014/062348
§ 371 (c)(1),
(2) Date: Nov. 6, 2015

(87) PCT Pub. No.: WO2014/181823
PCT Pub. Date: Nov. 13, 2014

(65) Prior Publication Data
US 2016/0084313 A1    Mar. 24, 2016

(30) Foreign Application Priority Data

May 10, 2013    (JP) .................................. 2013-100068

(51) Int. Cl.
*F16C 33/66* (2006.01)
*F16C 19/16* (2006.01)
(Continued)

(52) U.S. Cl.
CPC .......... *F16C 33/6674* (2013.01); *F16C 19/16* (2013.01); *F16C 19/52* (2013.01);
(Continued)

(58) Field of Classification Search
CPC ...... F16C 19/16; F16C 19/52; F16C 33/6674; F16C 41/008; F16C 41/004;
(Continued)

(56) References Cited

U.S. PATENT DOCUMENTS 3,951,476 A * 4/1976 Schulien ............. F16C 33/6607
184/31
4,265,496 A * 5/1981 Kofink ................ F16C 33/6607
384/397

(Continued)

FOREIGN PATENT DOCUMENTS

EP         1850019 A1 * 10/2007 .............. F16C 19/14
JP    2000274443 A  * 10/2000
(Continued)

OTHER PUBLICATIONS

International Search Report issued Aug. 12, 2014 in corresponding International Application No. PCT/JP2014/062348.

(Continued)

*Primary Examiner* — Marcus Charles
(74) *Attorney, Agent, or Firm* — Wenderoth, Lind & Ponack, L.L.P.

(57) ABSTRACT

A rolling bearing device includes a rolling bearing and an oil supply unit. The oil supply unit includes a lubrication oil tank, a pump which sucks lubrication oil from the lubrication oil tank and discharges the lubrication oil from a discharge porta driving section which drives the pump and a generator section which supplies the driving section with electric energy. The oil supply unit is attached to a fixed-ring-side member of the rolling bearing or a spacer adjacent to the rolling bearing. The oil supply unit further includes a communication unit which transmits operation information of the oil supply unit to an outside.

10 Claims, 8 Drawing Sheets

(51) Int. Cl.
*F16N 9/02* (2006.01)
*F16N 13/00* (2006.01)
*F16N 13/22* (2006.01)
*F16N 29/00* (2006.01)
*F16C 19/52* (2006.01)
*F16C 41/00* (2006.01)

(52) U.S. Cl.
CPC .......... *F16C 41/004* (2013.01); *F16C 41/008* (2013.01); *F16N 9/02* (2013.01); *F16N 13/00* (2013.01); *F16N 13/22* (2013.01); *F16N 29/00* (2013.01)

(58) Field of Classification Search
CPC .............. F16C 33/6659; F16C 33/6681; F16C 2322/39; F16N 9/02; F16N 13/00; F16N 13/22; F16N 29/00; F16N 2210/14; F04B 43/04
USPC ................ 384/397, 400, 462, 466, 471, 473
See application file for complete search history.

(56) References Cited

U.S. PATENT DOCUMENTS

| | | | |
|---|---|---|---|
| 5,020,636 A * | 6/1991 | Daeges | F04B 43/095 184/55.1 |
| 6,623,251 B2 * | 9/2003 | Nawamoto | B23Q 1/70 184/6.14 |
| 7,500,311 B2 * | 3/2009 | Shimomura | F16C 19/26 384/462 |
| 7,918,606 B2 * | 4/2011 | Akamatsu | F16C 19/163 384/462 |
| 2003/0030565 A1 | 2/2003 | Sakatani et al. | |
| 2005/0141796 A1 * | 6/2005 | Katsuzawa | F16C 33/6618 384/473 |
| 2006/0165328 A1 | 7/2006 | Ueno et al. | |
| 2007/0071382 A1 | 3/2007 | Suzuki | |
| 2008/0069488 A1 * | 3/2008 | Ueno | F16C 19/163 384/470 |
| 2008/0112661 A1 | 5/2008 | Suzuki et al. | |
| 2009/0046965 A1 * | 2/2009 | Akamatsu | F16C 19/163 384/474 |
| 2009/0148087 A1 | 6/2009 | Suzuki et al. | |
| 2010/0098368 A1 * | 4/2010 | van der Beek | F16C 27/08 384/563 |
| 2010/0166352 A1 | 7/2010 | Morita et al. | |
| 2011/0206306 A1 * | 8/2011 | Urano | F16J 15/162 384/473 |
| 2014/0341490 A1 | 11/2014 | Ito et al. | |

FOREIGN PATENT DOCUMENTS

| | | | | |
|---|---|---|---|---|
| JP | 2003-49859 | | 2/2003 | |
| JP | 2003-58976 | | 2/2003 | |
| JP | 2003-65328 | | 3/2003 | |
| JP | 2003-65835 | | 3/2003 | |
| JP | 2003-139155 | | 5/2003 | |
| JP | 2004-108388 | | 4/2004 | |
| JP | 2004-316707 | | 11/2004 | |
| JP | 2006125540 A | * | 5/2006 | |
| JP | 2006-194402 | | 7/2006 | |
| JP | 2006194406 A | * | 7/2006 | |
| JP | 2006-258192 | | 9/2006 | |
| JP | 2007-92886 | | 4/2007 | |
| JP | 2007-323665 | | 12/2007 | |
| JP | 2008303988 A | * | 12/2008 | |
| JP | 2009063034 A | * | 3/2009 | |
| JP | 2009-138883 | | 6/2009 | |
| JP | 2009-144781 | | 7/2009 | |
| JP | 2013-60999 | | 4/2013 | |
| JP | 2013-76428 | | 4/2013 | |
| JP | 2013-83335 | | 5/2013 | |
| JP | 2014-31810 | | 2/2014 | |
| JP | 2014-37878 | | 2/2014 | |
| WO | WO 2006075741 A1 * | | 7/2006 | ............. F16C 19/14 |
| WO | 2013/038982 | | 3/2013 | |

OTHER PUBLICATIONS

Notification Concerning Transmittal of International Preliminary Report on Patentability issued Nov. 10, 2015 in corresponding International Application No. PCT.JP2014/062348 (with English Translation).
Notification of Transmittal of Translation of the International Preliminary Report on Patentability issued Nov. 10, 2015 in corresponding International Application No. PCT/JP2014/062348.
European Search Report issued Dec. 7, 2016 in European Patent Application No. 14794949.9.

* cited by examiner

ROLLING BEARING DEVICE

TECHNICAL FIELD

The present invention relates to rolling bearing devices used in machine tools, industrial machinery, etc., and particularly to a rolling bearing device constituted as a combination of a rolling bearing and an oil supply unit.

BACKGROUND ART

A rolling bearing device which incorporates an oil supply unit therein is conventional (see Patent Literature 1). In this rolling bearing device, an oil supply unit is mounted on an inner diameter surface of one of two mutually opposed track rings of the rolling bearing, or a fixed-side track ring in this case. The oil supply unit includes a lubrication oil tank which stores lubrication oil; a pump which pumps out the lubrication oil stored in the lubrication oil tank into the bearing; and an electric power generator which drives the pump. The device also includes means which controls the pump in accordance with bearing conditions thereby controlling an amount of discharged oil.

Patent Literature 2 also discloses a rolling bearing device which includes a similar oil supply unit.

CITATION LIST

Patent Literature

Patent Literature 1: JP-A 2004-108388 Gazette
Patent Literature 2: JP-A 2004-316707 Gazette

SUMMARY OF INVENTION

Technical Problem

Often, the oil supply unit which is incorporated near the bearing is in an environment which is inaccessible from outside. In order to monitor, troubleshoot or otherwise service the oil supply unit, it is necessary to perform regular overhaul or provide communication lines, for example, extended to the outside. This poses limits on use and/or assemblability.

It is therefore an object of the present invention to provide a rolling bearing device which allows checking if its oil supply unit is functioning properly while the bearing device is under an assembled state, without any need for disassembly or communication lines, for example, extended to the outside.

Solution to Problem

As a solution to the above-described problems, the present invention provides a rolling bearing device comprising a combination of a rolling bearing and an oil supply unit which includes at least: a lubrication oil tank, a pump which sucks lubrication oil from the lubrication oil tank and discharges the lubrication oil from a discharge port; a driving section which drives the pump; and a generator section which supplies the driving section with electric energy. The oil supply unit is attached to a fixed-ring-side member of the rolling bearing or a spacer adjacent to the rolling bearing, and the oil supply unit further includes, within itself, a communication unit which transmits operation information of the oil supply unit to an outside.

The oil supply unit may have its constituent members incorporated inside a housing to form a unit for attaching to/detaching from the housing.

The communication unit may be provided by one which transmits the information by means of an oscillatory wave.

There may be a plurality of the oil supply units, each served by the communication unit so that these oil supply units are simultaneously usable.

The rolling bearing device according to the present invention can be usable in machine tools, wind turbines and railway systems.

Advantageous Effects of Invention

According to the present invention, a communication unit which transmits operation information of the oil supply unit to an outside is provided inside the oil supply unit. Therefore, it is possible to check the oil supply unit as assembled, that it is functioning properly. Further, detection by means of oscillatory waves provides such advantages as it enables wireless information communication possible, it makes it possible to improve assemblability, and it enables simultaneous use of a plurality of the oil supply units.

BRIEF DESCRIPTION OF DRAWINGS

FIG. 9A shows a state before oscillation, whereas
FIG. 9B shows a state after oscillation.

DESCRIPTION OF EMBODIMENTS

Hereinafter, embodiments of the present invention will be described based on the attached drawings.

Figure 1:
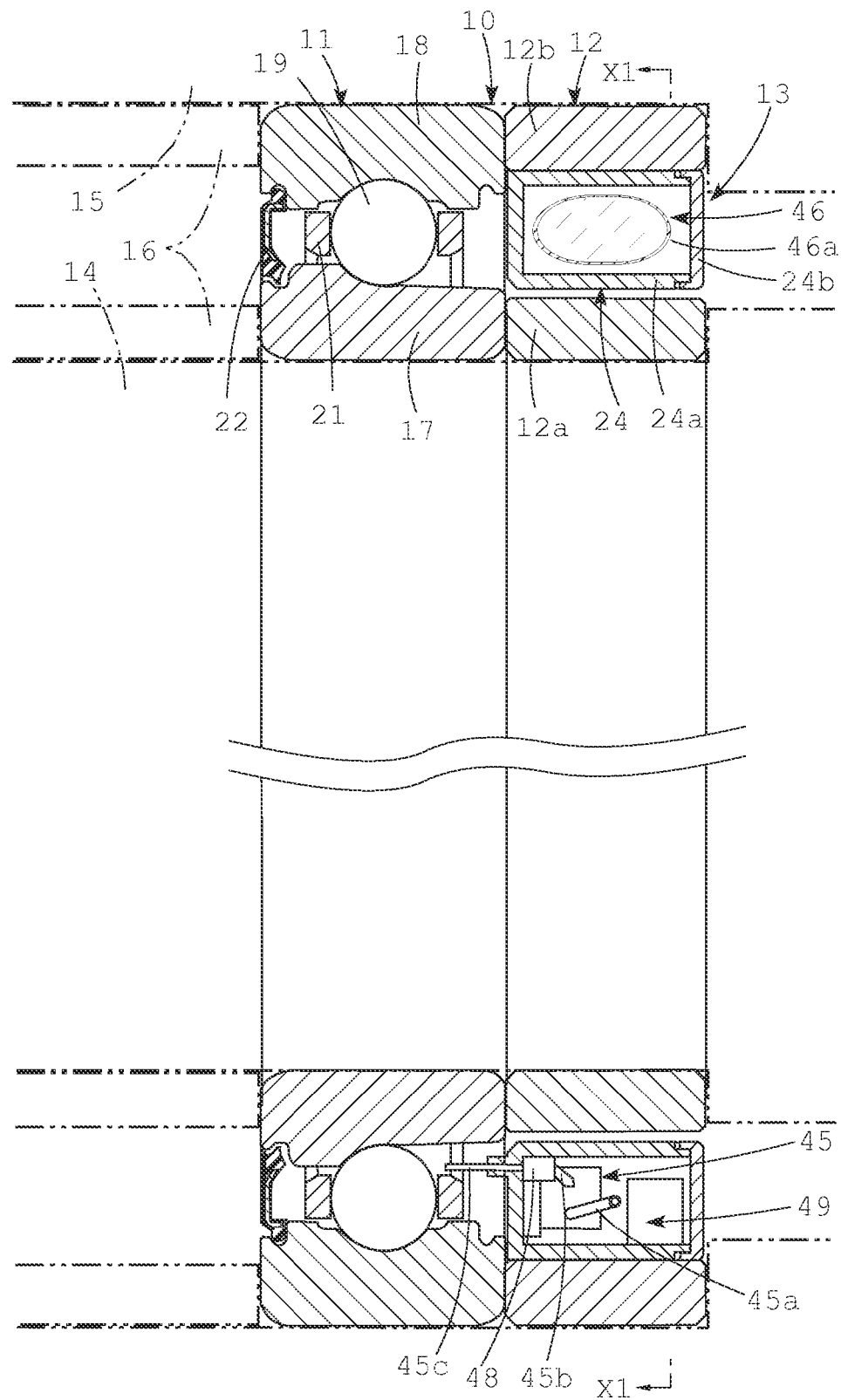
FIG. 1 is a sectional view taken in lines A-A in FIG. 3.
Figure 2:
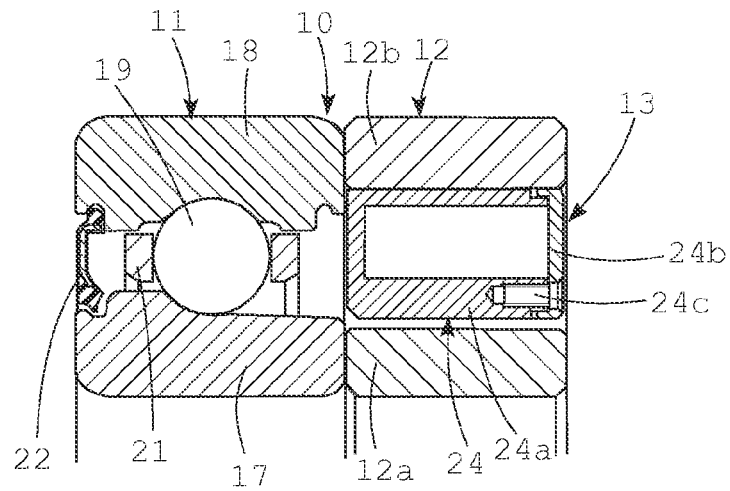
FIG. 2 is a partial sectional view taken in lines B-B in FIG. 3.
Figure 3:
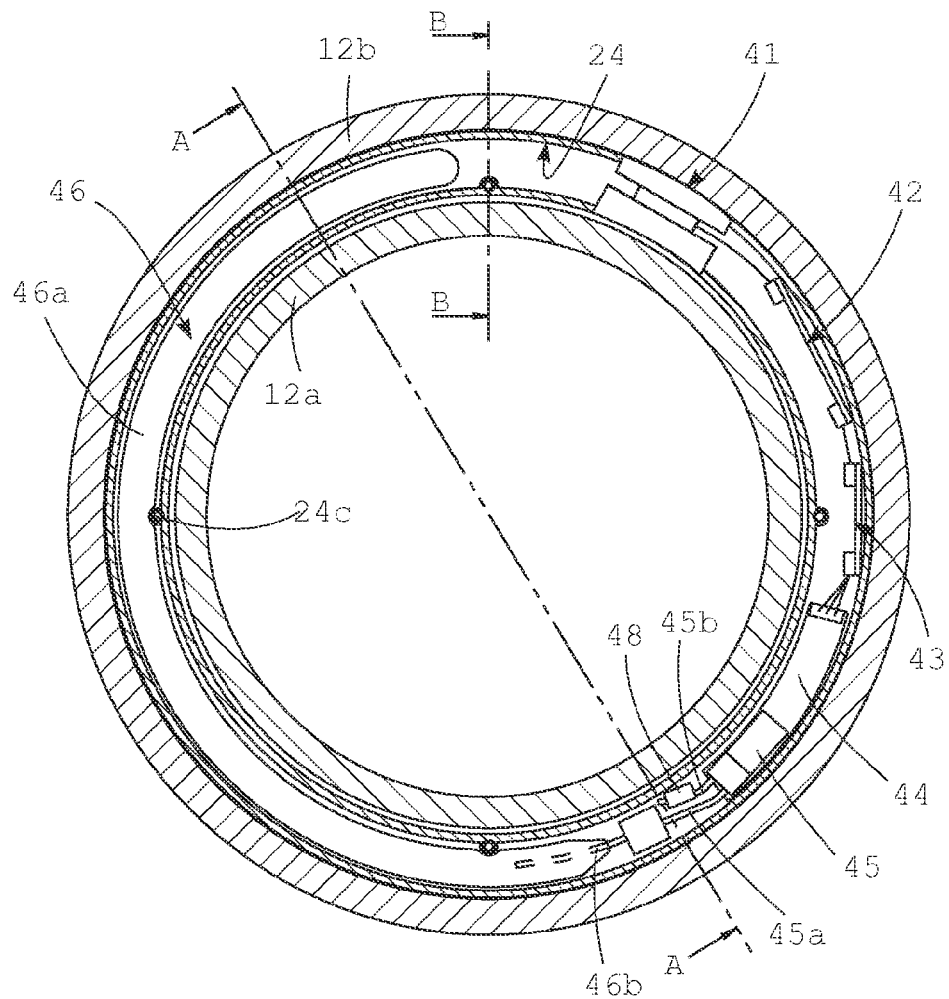
FIG. 3 is a sectional view of an oil supply unit taken in lines X1-X1 in FIG. 1.

The rolling bearing device 10 according to the embodiments shown in FIG. 1 through FIG. 3 includes a rolling bearing 11; a spacer 12 press-contacted onto an axial end of the rolling bearing; and an oil supply unit 13 incorporated in the spacer 12; and when used, is assembled into a space between a rotation shaft 14 and a housing 15. The rolling bearing 11 has another end, on which another spacer 16 is press-contacted. These two spacers 12, 16 provide axial positioning of the rolling bearing 11. The rotation shaft 14 in this embodiment is horizontal.

The rolling bearing 11 may be provided by whichever of an angular contact ball bearing and a deep groove roller bearing, and includes a rotation-side track ring provided by an inner ring 17; an outer ring 18 on a fixed side; a predetermined number of rolling elements 19 placed between these track rings; and a retainer 21 which keeps a predetermined distance between the rolling elements 19. The rolling bearing 11 is pre-packed with desirable grease, and a seal plate 22 is attached to an end on the spacer 16 side.

The spacer 12 includes an inner-ring-side spacer 12a and an outer-ring-side spacer 12b. The inner-ring-side spacer 12a is fitted in and fixed to the rotation shaft 14 side and is press-contacted onto an end surface of the inner ring 17. The outer-ring-side spacer 12b is fitted in and fixed to an inner diameter surface of the housing 15, and is press-contacted onto an end surface of the outer ring 18. The other spacer 16 is also fitted in and fixed to the rotation shaft 14 side and the housing 15 side in the same fashion, and is press-contacted onto the other end surfaces of the inner ring 17 and of the outer ring 18.

As shown in FIG. 3, the oil supply unit 13 includes a generator section 41, a charger section 42, a controller 43, a driving section 44, a pump 45, a lubrication oil tank 46, a communication unit 49 which wirelessly transmits operating information of the oil supply unit 13, and other components, which are arranged in an annular housing 24 in a circumferential direction thereof.

As shown in FIG. 2, the annular housing 24 of the oil supply unit 13 is constituted by a housing main body 24a which has a generally U-shaped section with an open end facing away from the rolling bearing 11; and a lid 24b which closes the open end of the housing main body 24a and is detachable from/attachable to the housing main body 24a. The housing main body 24a and the lid 24b are made of the same thermally plastic resin material such as PPS.

The lid 24b of the housing 24 is fixed to the housing main body 24a with screws 24c. By unscrewing the screws 24c and removing the lid 24b, it becomes possible to replenish the lubrication oil tank 46 inside the housing main body 24a with lubrication oil without removing the entire oil supply unit 13.

The housing main body 24a has its outer circumferential surface adhesively fixed to an inner diameter surface of the outer-ring-side spacer 12b. The adhesive for fixing the housing main body 24a may be provided by epoxy resin for example.

Next, the lubrication oil tank 46 which is incorporated inside the housing main body 24a is provided by a bag 46a of an elastic resin, and is disposed in an arcuate form along the annular casing 24.

The bag 46a has a suction tube 45a connected to the pump 45. The suction tube 45a may be integrated with the bag 46a by sandwiching the tube between two films of resin which will be formed into the bag 46a and then performing thermal welding to complete the bag 46a.

When the bag 46a is formed by blow molding, a suction tube 45a may be blow-formed integrally with the bag 46a.

The bag 46a which constitutes the lubrication oil tank 46 can be formed of such a material as nylon, polyethylene, polyester and polypropylene; there is no specific limitation to the material as far as the material is not attacked by lubrication oil stored in the bag 46a.

Lubrication oil which is loaded in the bag 46a of the lubrication oil tank 46 desirably has a viscosity of VG22 for example, since an excessively high viscosity will cause too much burden on the pump and the power source.

The pump 45 has a suction tube 45a which sucks lubrication oil from the lubrication oil tank 46; and a discharge tube 45b from which the sucked lubrication oil is discharged. The discharge tube 45b has a discharge nozzle 45c at its tip, from which lubrication oil is supplied to between the fixed-side track ring and the rotation-side track ring of the rolling bearing 11.

As the pump 45 is driven, lubrication oil in the lubrication oil tank 46 is sucked. The lubrication oil is supplied from the discharge nozzle 45c at a tip of the discharge tube 45b to between a fixed and a rotating track rings of the rolling bearing 11. After a predetermined amount of the lubrication oil is supplied, the pump 45 is stopped.

Even if the pump 45 is stopped, interior of the pump 45 and interior of the tube are filled with lubrication oil, so there can be a case where lubrication oil inside the lubrication oil tank 46 is siphoned and leaked out of the discharge nozzle 45c. In order to prevent this leakage, a leak prevention mechanism which prevents lubrication oil leakage is provided in discharge tubing of the pump 45.

This leak prevention mechanism can be implemented as shown in FIG. 3 as an arrangement that the discharge tube 45b is provided with an on-off valve 48, and the on-off valve 48 opens only when the pump 45 is working whereas the on-off valve 48 is closed in all the other occasions. Another example is an arrangement that after the pump 45 is driven and the oil supply operation is finished, the pump 45 is driven in reverse direction to introduce air into the discharge tubing.

Timing of the supply of lubrication oil, i.e., timing to drive the pump 45 may be when electricity is charged in a condenser in the charger section 42 and a predetermined voltage is reached. If power generation efficiency is too good and the charging time is too short, the stored voltage may be discharged to a resister, for example, when a predetermined voltage value is reached, so that an interval may be made in operation timing of the pump 45. In this case, there is a cycle(s) of charging and discharging before the pump 45 is operated. The number of this charge-discharge cycles can be used in controlling the operation interval of the pump 45. As another example, a timer function may be used to trigger when the power storage voltage is reached a predetermined value, to provide an interval in the operation cycle of the pump 45. In this case, the above-described charge-discharge cycle is not repeated.

The suction tube 45a, which is connected to the suction side of the pump 45, extends into the lubrication oil tank 46 to suck lubrication oil stored in the lubrication oil tank 46.

On the other hand, the discharge tube 45b which is connected to the discharge side has its tip connected to a discharge nozzle 45c for discharging lubrication oil into the rolling bearing. It is desirable that the discharge nozzle 45c has its tip disposed at a location between the inner and the outer rings of the bearing closely to the inner ring's outer circumferential surface. The discharge nozzle 45c has a nozzle hole of an appropriate inner diameter based on a relationship between surface tension due to base oil viscosity and the amount of discharge.

The annular housing 24 incorporates, other than the lubrication oil tank 46, the following and other components in its circumferential direction; the generator section 41, the charger section 42, the controller 43, the driving section 44, the pump 45, and the communication unit 49 which wirelessly transmits operating information of the oil supply unit 13.

Figure 4:
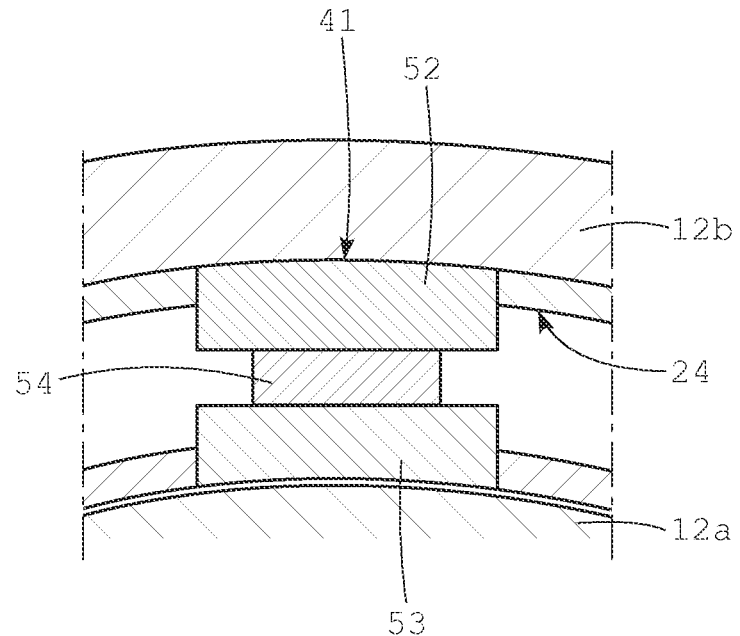
FIG. 4 is an enlarged sectional view showing an example of an electric power source of an oil supply unit.

As shown in FIG. 4, the generator section 41 can be provided by one which generates electric power by way of Seebeck effect. When the rolling bearing device 10 is operating, temperature of the inner ring 17 and the outer ring 18 increases due to friction heat with the rolling elements 19 (see FIG. 1). In general configuration, the outer ring 18 is assembled into the housing 15 of the machine it serves, and therefore loses heat by thermal conduction, resulting in temperature difference between the inner ring 17 and the outer ring 18. Different temperatures conducted to the respective heat conductors 52, 53 causes the Seebeck element 54 to have temperature difference between its two end surfaces, causing the element to generate electric power according to Seebeck effect.

When using the above configuration where heat conductors 52, 53 are provided to penetrate the inner circumferential surface and the outer circumferential surface of the housing main body 24a respectively and a Seebeck element 54 is placed between these heat conductors 52, 53, an adhesive having good heat conductivity should desirably be used on a surface where the heat conductor 52 which penetrates the outer circumferential surface of the housing main body 24a makes contact with the inner diameter surface of the outer ring-side spacer 12b. It should be noted here that the heat conductor 52 which is on the outer ring-side has its outer diameter equal to an inner diameter of the outer ring spacer 12b and is fitted thereto for improved heat release. On the other hand, the heat conductor 53 which is on the inner ring side has its inner diameter surface not in contact with the inner ring spacer 12a. If possible, it is desirable that the outer ring-side and the inner ring-side heat conductors 52, 53 have the same volume.

Preferably, thermal grease, for example, should be applied between the inner diameter surface of the outer-ring-side spacer 12b and the heat conductor 52; between the heat conductor 52 and the Seebeck element 54; and between the Seebeck element 54 and the inner-ring-side heat conductor 53, for improved contact and heat conductivity. Thermal grease generally contains silicone as a primary ingredient. The heat conductors 52, 53 should be made of a metal which has a high heat conductivity rate. For example, silver, copper, gold, etc. are good candidates, among which copper is the most common due to cost reasons. In addition, copper alloys which contain copper as a primary ingredient can also be used. Further, sintered bodies containing copper as a primary ingredient are also usable.

Figure 5:
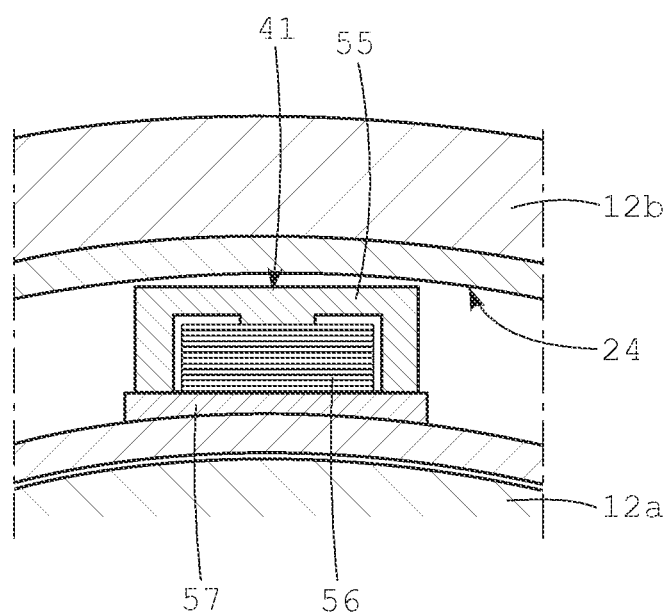
FIG. 5 is an enlarged sectional view showing an example of an electric power source of an oil supply unit.
Figure 6:
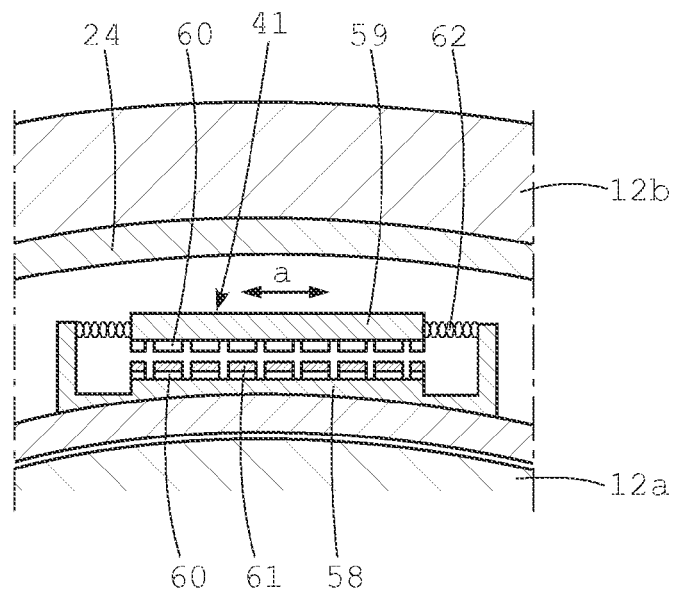
FIG. 6 is an enlarged sectional view showing an example of an electric power source of an oil supply unit.
Figure 7:
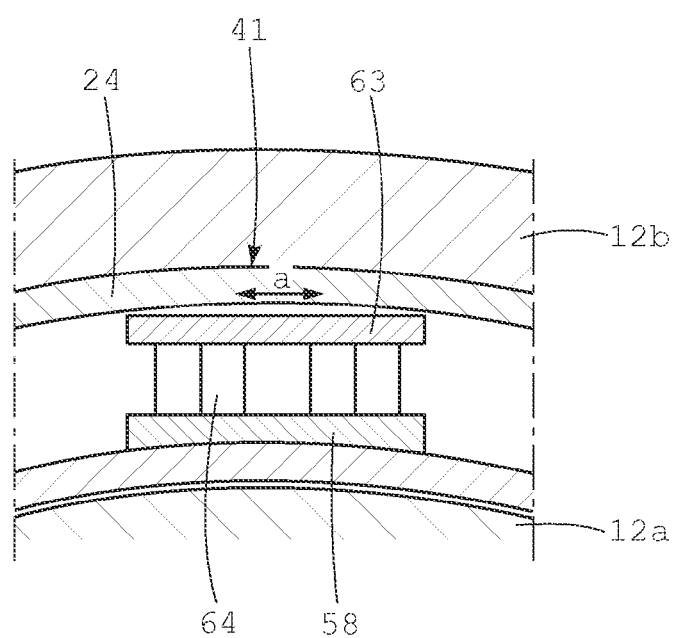
FIG. 7 is an enlarged sectional view showing an example of an electric power source of an oil supply unit.

Other than those which generate electric power by way of Seebeck effect, the generator section 41 may be provided by any of those shown in FIG. 5, FIG. 6 and FIG. 7.

The one shown in FIG. 5 is applicable when there is an alternating magnetic field inside the rolling bearing device 10. Inside built-in spindles of machine tools, or near high-frequency apparatus which handle large amount of electric power, there is leakage magnetic flux or high-frequency radiation. The leakage flux is utilized to generate power by way of electromagnetic induction. More specifically, a combination of an iron core 55 which has an E-shaped profile with one of its sides open, and a coil 56 are combined to catch the alternating magnetic field efficiently to generate power by electromagnetic induction. The open end of the iron core 55 is provided with an insulating base 57. If the frequency of the leak flux is known, the iron core 55 may be eliminated and the coil 56 which resonates with the frequency of the leak flux may be used.

The one shown in FIG. 6 is applied when there is vibration inside the rolling bearing device 10. Specifically, a fixed-side insulation substrate 58 is opposed by a moving-side insulation substrate 59, with each of the substrates being formed with a large number of electrodes 60 and only the electrodes 60 on the fixed-side insulation substrate 58 being laminated with electrets 61 to oppose to the electrodes 60 on the moving-side insulation substrate 59, with a gap. The moving-side insulation substrate 59 is only movable in a direction indicated by Arrow a in the drawing by a mover 62.

When there is vibration in the rolling bearing device 10, the mover 62 causes the moving-side insulation substrate 59 to oscillate in the Arrow a direction. This generates electric charge between the electrodes 60 due to electrostatic induction caused by relative movement between the fixed-side insulation substrate 58 and the moving-side insulation substrate 59, and by the electrets 61 thereon. The generated charge is tapped for use as electric power.

The one shown in FIG. 7 is also for application when there is vibration inside the rolling bearing device 10. Specifically, an elastic sheet of piezoelectric body 64 is disposed between a fixed-side insulation substrate 58 and a weight 63. Vibration generated in the rolling bearing device 10 causes the weight 63 to oscillate in the Arrow a direction due to the weight 63 and the piezoelectric body 64. The process causes deflection in the piezoelectric body 64, and an electromotive force by way of induced polarization. The generated electromotive force is tapped for use as electric power.

Electric charge generated by the generator section 41 is stored in the charging section 42 which is provided by a battery, condenser, etc. If a condenser is employed, an electric double layer condenser (capacitor) is desirably used.

Figure 8:
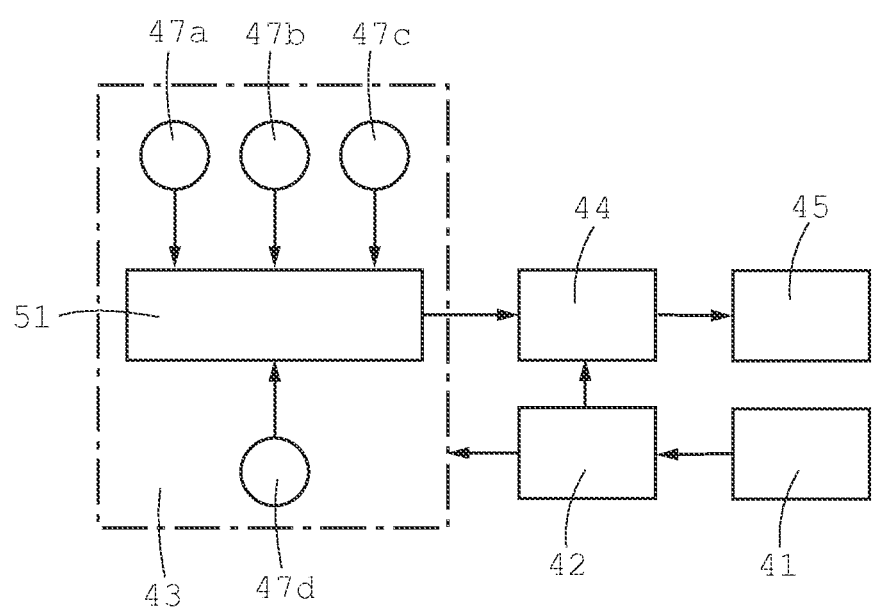
FIG. 8 is a detailed block diagram of a controller.

As shown in FIG. 8, the controller 43 has sensors such as a bearing temperature sensor 47a, a bearing rotation sensor 47b, a lubricant remaining quantity sensor 47c, and a lubrication oil temperature sensor 47d. Signals from these sensors are inputted to a CPU 51, which then automatically controls the pump 45 in accordance with temperature and rotation status of the rolling bearing 11, thereby controlling the amount of lubrication oil supply.

The communication unit 49 is attached to the outer-ring-side spacer 12b as shown in FIG. 1. The communication can be made by means of oscillatory waves. Use of oscillatory waves makes wireless communication possible and improves assemblability.

Figure 9A:
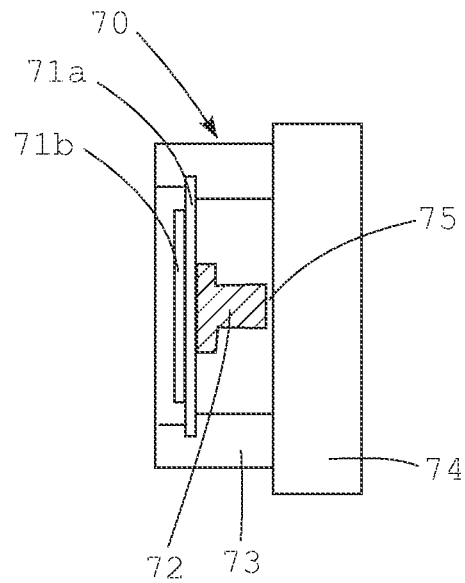
FIGS. 9A and 9B are schematic illustrations which show an example of a communication device that utilizes oscillatory waves in information transmission.
Figure 9B:
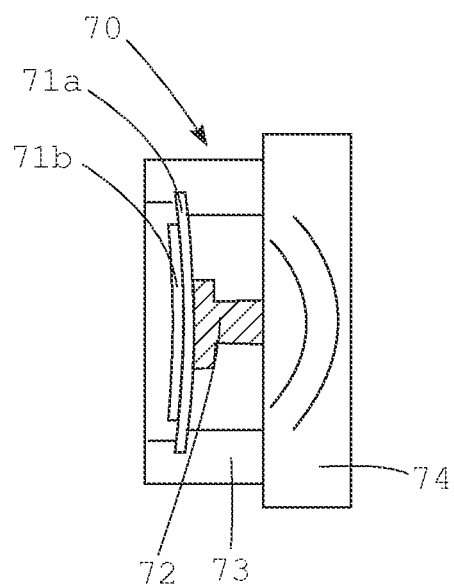

FIG. 9 shows an oscillatory wave generator 70. Referring to FIGS. 9A and 9B, a piezoelectric body 71b is pasted onto a metal plate 71a. On a surface of the metal plate 71a facing away from the piezoelectric body 71b, a hammer 72 is provided. These are supported by a fixed case 73, which is fixed to an oscillatory wave conduction medium 74. The hammer 72 and the oscillatory wave conduction medium 74 are separated from each other by a small gap 75. As a voltage is applied to the piezoelectric body 71b in this component, a piezoelectric effect (inverse piezoelectric effect) causes the piezoelectric body 71b to deform mechanically as shown in FIG. 9B. Accordingly, the metal plate 71a is deformed, causing the hammer 72 to hit the oscillatory wave conduction medium 74 to become a source of oscillatory wave, to generate oscillatory waves inside the oscillatory wave conduction medium 74. The oscillatory waves travel through the oscillatory wave conduction medium 74. It should be noted here that in an actual application, the oscillatory wave conduction medium 74 is provided by the housing 24 or the like which houses the outer-ring-side spacer 12b and the oil supply unit 13 in FIG. 1.

Figure 10:
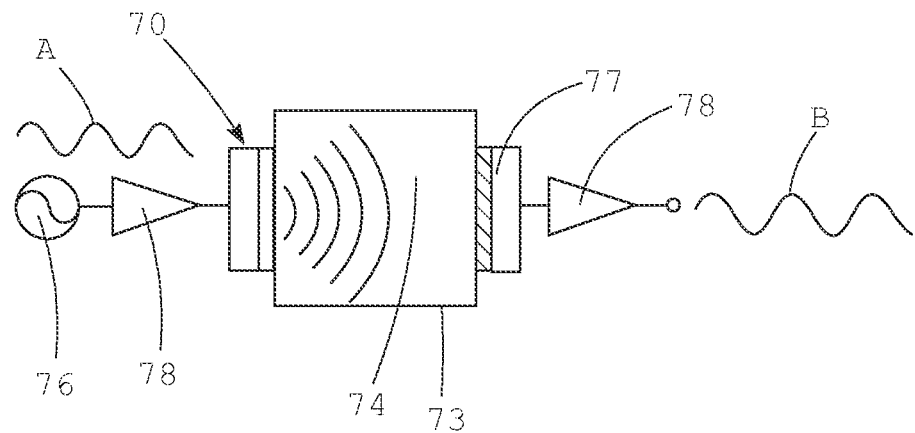
FIG. 10 is a schematic illustration which shows an example including a communication devices that utilize oscillatory waves in information transmission.

By using the oscillatory waves obtained by the above-described methods, communication is performed as follows:

As shown in FIG. 10, the oscillatory waves are detected by an oscillatory wave detector 77 which is disposed to oppose to the oscillatory wave generator 70 to sandwich the oscillatory wave conduction medium 74.

In FIG. 10, the oscillatory wave generator 70 is driven at a frequency generated by a wave-form generator 76 which generates an oscillatory wave A of a predetermined frequency. This oscillatory wave A travels through the oscillatory wave conduction medium 74 and reaches the oscillatory wave detector 77. The oscillatory wave detector 77 converts the oscillatory wave A into an electrical signal. A reference symbol B indicates a detected wave form.

By utilizing the communication means described above, it is possible to wirelessly check a state of operation of the oil supply unit 13 which is assembled inside the relevant component. In FIG. 10, a reference symbol 76 indicates the wave-form generator for generation of the oscillatory waves A, a reference symbol 78 indicates an amplifier, a reference symbol 74 indicates the oscillatory wave conduction medium, and a reference symbol 77 indicates the detector.

The state of operation of the oil supply unit 13 can be specifically identified by the following means: The oscillatory wave A is generated at each time of pump operation. Each time the oscillatory wave A is detected, it is counted in an accumulating fashion. This makes it possible to estimate how much lubricant remains. At the same time, it is also possible to confirm that the oil supply unit 13 is functioning properly.

Figure 11:
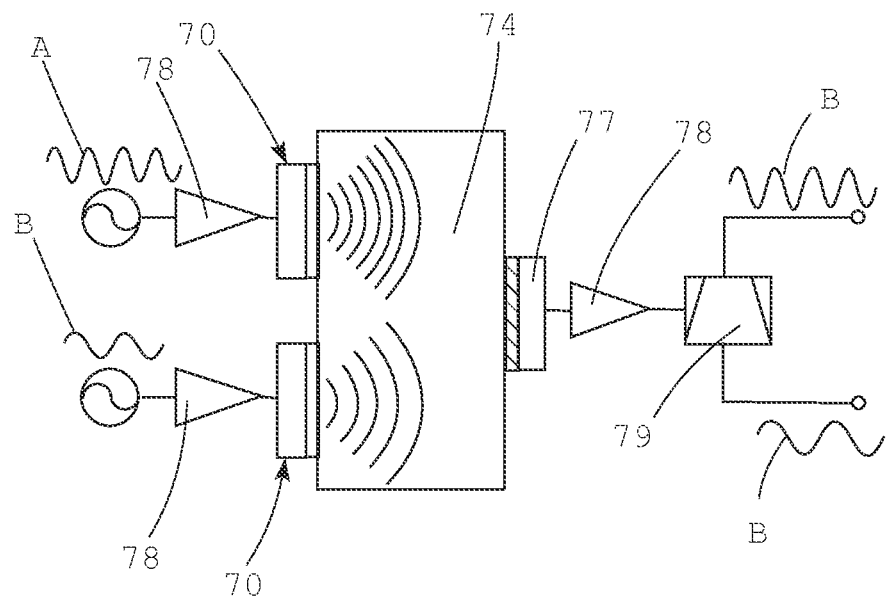
FIG. 11 is a schematic illustration which shows an example including a plurality of communication devices that utilize oscillatory waves in information transmission.

A plurality of oil supply units 13 may be assembled to implement the communication means, as shown in FIG. 11.

Basic constituent elements are identical with those shown in FIG. 10; however, each of the two components has one of two oscillators 76a, 76b which are different from each other in the frequencies they generate. Also, a filter 79 is provided on the detection side, to receive signals of specific frequencies. Utilizing this means makes it possible to check a state of operation of a specific oil supply unit.

Figure 12:
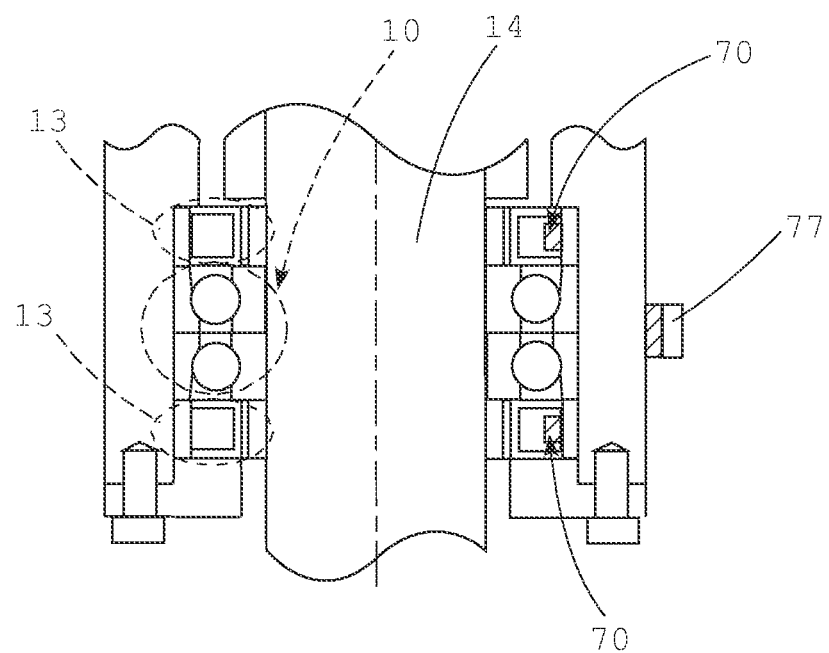
FIG. 12 is a schematic illustration which shows an example where an oil supply unit according to the present invention is mounted around a main shaft of a machine tool.

FIG. 12 shows rolling bearing devices 10 each incorporating an oil supply unit 13 that has the functions described above. FIG. 12 shows part of a spindle (rotation shaft 14) around which the oil supply units 13 are mounted. The oscillatory wave A travels through the outer-ring-side spacer 12b and the housing 15. Then, the oscillatory wave A is detected by an oscillatory wave detector 77 which is attached to the housing 15. The frequency of the oscillatory wave A is selected to be different from the vibration frequency generated by the rolling bearing 11 and from a natural frequency (resonant frequency) of the spindle 14. By selecting such a frequency, it becomes easy to detect the oscillation generated by the oscillatory wave generator and to eliminate unnecessary resonance of the components.

As described above, by providing an oscillatory wave communication component inside the oil supply unit 13, it becomes possible to check an electrical component as assembled, that the electrical component is functioning properly. Further, detection by means of oscillatory waves provides such advantages as it enables wireless information communication possible, it makes it possible to improve assemblability, and it enables simultaneous use of a plurality of the oil supply units 13.

REFERENCE SIGNS LIST

10 Bearing Device
11 Rolling Bearing
12 Spacer
12a Inner Ring Side Spacer
12b Outer-Ring-Side Spacer
13 Oil Supply Unit
14 Rotation Shaft
15 Housing
16 Spacer
17 Inner Ring
18 Outer Ring
19 Rolling Element
21 Retainer
22 Seal Plate
24 Housing
24a Housing Main Body
24b Lid
24c Screw
41 Generator Section
42 Charger Section
43 Controller
44 Driving Section
45 Pump
45a Suction Tube
45b Discharge Tube
45c Discharge Nozzle
46 Lubrication Oil Tank
46a Bag
46b Thermally Welded Portion
47a through 47d Sensors
48 ON-OFF Valve
49 Communication Unit
51 CPU
52, 53 Conductors
54 Seebeck element
55 Iron Core
56 Coil
57 Insulating Base
58 Fixed-Side Insulation Substrate
59 Moving-Side Insulation Substrate
60 Electrodes
61 Electrets
62 Mover
63 Weight
645 Piezoelectric Body
70 Oscillatory Wave Generator
71a Metal Plate
71b Piezoelectric Body
72 Hammer
73 Fixed Case
74 Oscillatory Wave Conduction Medium
75 Small Gap
76a, 76b Oscillators
77 Oscillatory Wave Detector
79 Filter

The invention claimed is:

1. A rolling bearing device comprising
a combination of a rolling bearing and an oil supply unit which includes at least:
a lubrication oil tank,
a pump which sucks lubrication oil from the lubrication oil tank and discharges the lubrication oil from a discharge port;
a driving section which drives the pump; and
a generator section which supplies the driving section with electric energy;
wherein the oil supply unit is attached to a fixed-ring-side member of the rolling bearing or a spacer adjacent to the rolling bearing,
wherein the oil supply unit further includes, within itself, a communication unit which transmits operation information of the oil supply unit to an outside.

2. The rolling bearing device according to claim 1, wherein the oil supply unit has its constituent members incorporated inside a housing to form a unit, and the housing is attached to the fixed-ring-side member or the spacer.

3. The rolling bearing device according to claim 1, wherein the communication unit transmits the operation information by means of an oscillatory wave.

4. The rolling bearing device according to claim 1, wherein the oil supply unit comprises
   a plurality of oil supply portions, wherein these oil supply portions are simultaneously usable.

5. The rolling bearing device according to claim 1, for use in a machine tool, a windmill or a railway system.

6. The rolling bearing device according to claim 1, wherein the operation information includes information that the oil supply unit is functioning properly.

7. The rolling bearing device according to claim 1, wherein the communication unit further comprises:
   a bearing temperature sensor;
   a bearing rotation sensor;
   a lubricant remaining quantity sensor; and
   a lubrication oil temperature sensor.

8. The rolling bearing device according to claim 1, wherein the communication unit further comprises
   an oscillatory wave generator;
   wherein the oscillatory wave generator transmits the operation information outside the oil supply unit.

9. The rolling bearing device according to claim 8, wherein the oscillatory wave generator comprises
   a piezoelectric output element.

10. The rolling bearing device according to claim 1, wherein the oscillatory wave is transmitted audibly.

* * * * *